Patented Jan. 10, 1939

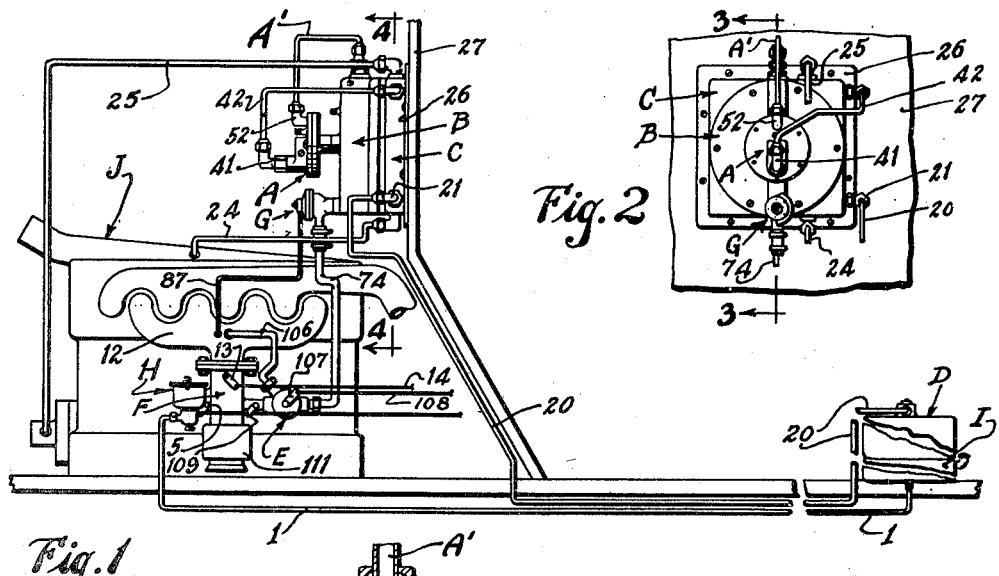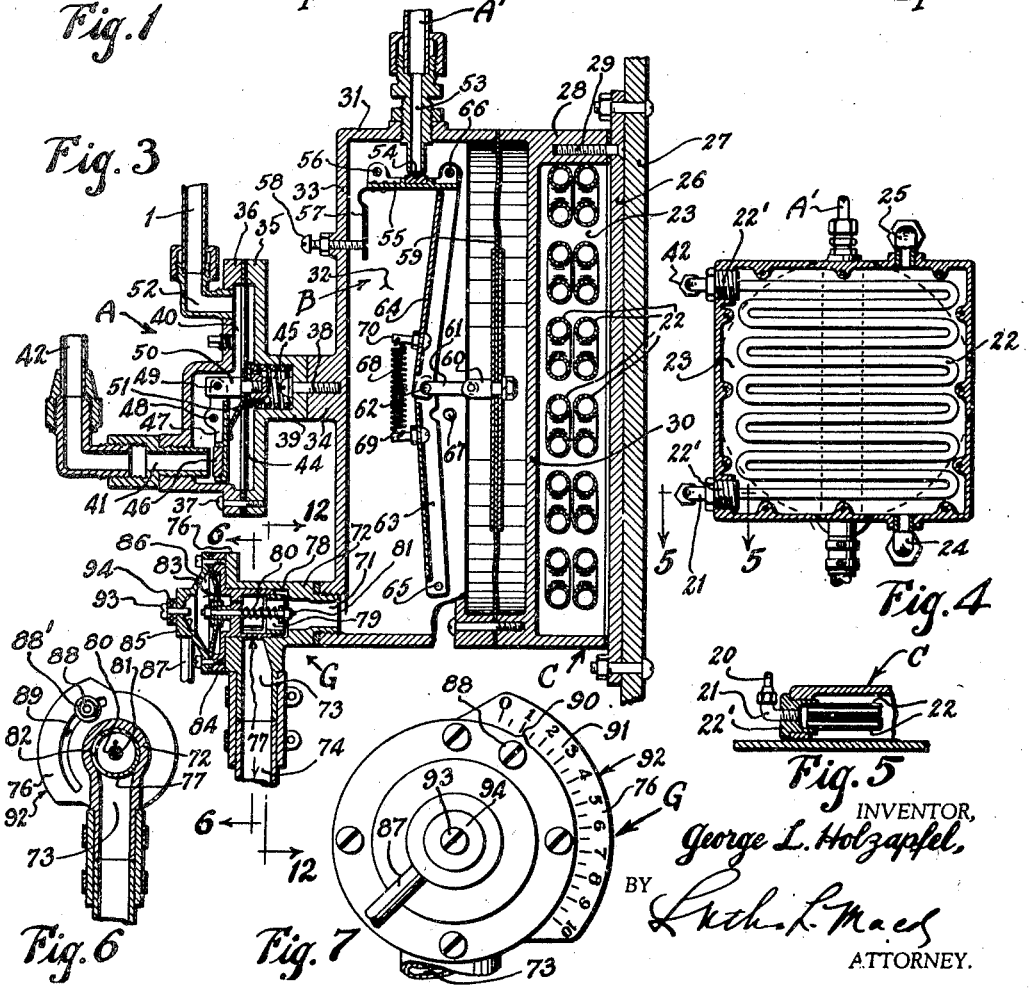

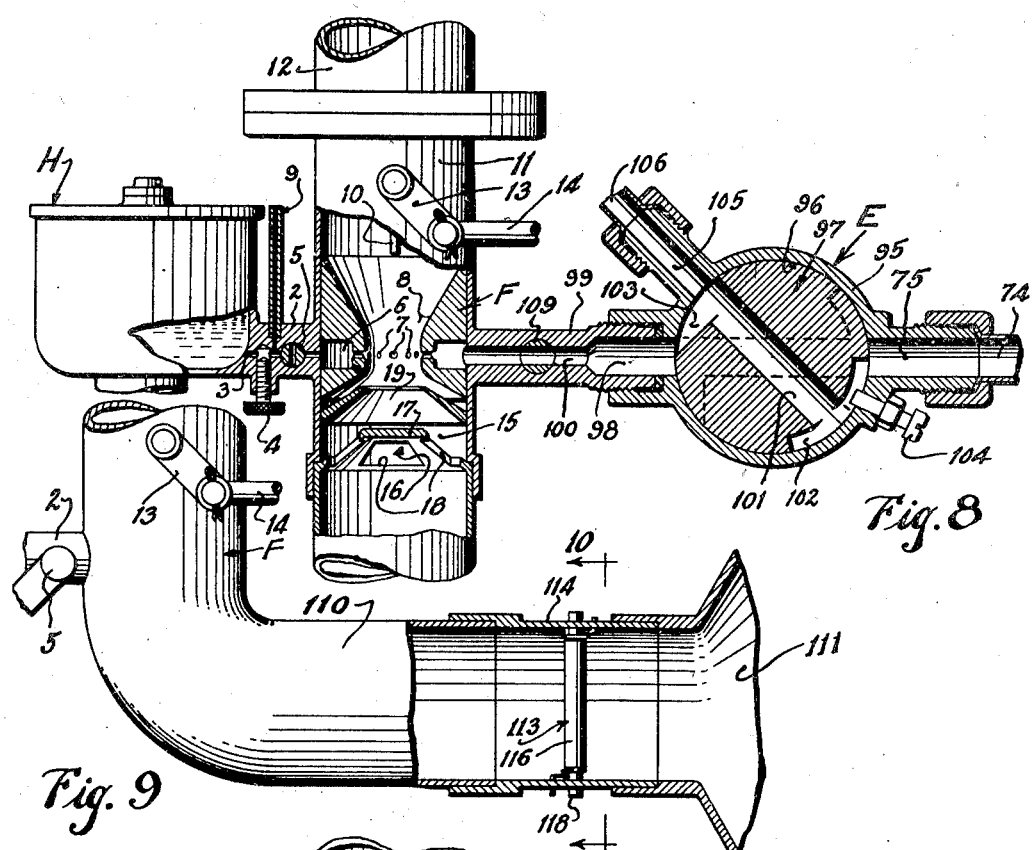
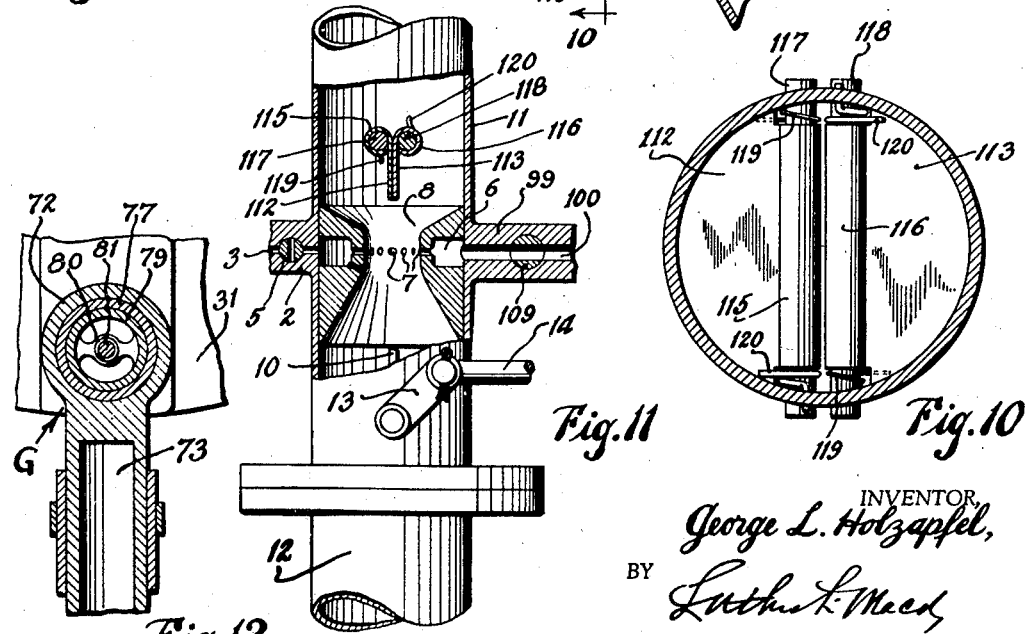

2,143,194

UNITED STATES PATENT OFFICE 2,143,194

CARBURETION APPARATUS FOR INTERNAL COMBUSTION ENGINES

George L. Holzapfel, Los Angeles, Calif.

Application August 28, 1935, Serial No. 38,257

10 Claims. (Cl. 48—184)

My invention comprehends the provision of an apparatus for use in connection with internal combustion engines for supplying a highly volatile fuel such as butane and a less volatile fuel such as gasoline, to an engine under complete control under all operating conditions, selectively, so that different fuels may be used under different conditions, at the will of an operator.

It will be understood that in the use of butane for internal combustion engines operating requirements differ materially from the requirements of engines using gasoline. Butane in its natural state generates pressure in a tank or container which is preferably relieved and reduced to atmospheric pressure before introducing it into a combustion engine and the carburetion requirements are also greatly different from the requirements for the use of less volatile fuels. Hence, it is an object of this invention to provide a carburetion system including a pressure reducing mechanism for insuring the reduction of the pressure of fuel to approximately atmospheric before introduction to a motor.

Another object is to provide a heat exchanger intermediate the source of gas supply and the pressure reducing means and preferably self contained with the pressure reducing means, so as to insure a constant supply of volatile fuel at all times, together with means for controlling the supply of butane in accordance with variable operating conditions.

A particular object is to provide an economizer in association with the pressure reducing means at a point in advance of the introduction of fuel to a motor, which is provided with one or more adjustments, fixed or variable during operation, for the purpose of varying the volume of gas so as to render the operation of a motor economical.

I contemplate further the provision of means for providing and carbureting a dual fuel supply whereby gasoline and butane may be selectively used in an engine, under different conditions, and including a usual gasoline carburetor and a butane carburetor of special design commonly connected with a venturi and with shut off valves interposed between the venturi and the separate sources of supply.

Another object is to provide: an automatic choke device adapted for operation by the suction of the incoming air for increasing the suction on the gas regulator in order to overcome the force with which the nozzle of the regulator is held closed. Thus leakage of gaseous fuel is prevented when the engine stops. Such control is necessary to insure that the gaseous fuel and incoming air shall be at exactly the same pressure for delivery to the carburetor. Still further objects are to provide: an adjustable starting valve interposed between the venturi and the pressure regulator for the butane fuel and having a by-pass to the intake manifold; and other minor but important details of structure and connections which combine with major features of my apparatus to provide a comprehensive, effective and economical system of carburetion of fuels for internal combustion motors.

I have shown in the accompanying drawings a preferred form of apparatus, with certain modifications, embodying my improvements, but further subject to modification, within the scope of the appended claims, without departing from the spirit of my invention.

In said drawings:

Fig. 1 is a side elevation of an internal combustion motor shown as operatively connected with my carburetor apparatus and a dual fuel storage means;

Fig. 2 is a front view of the pressure regulator and heat exchanger unit shown in Fig. 1;

Fig. 3 is a sectional elevation of the pressure regulator and heat exchanger unit on line 3—3 of Fig. 2;

Fig. 4 is a section of the same on line 4—4 of Fig. 1;

Fig. 5 is a fragmentary section of the heat exchanger on line 5—5 of Fig. 4;

Fig. 6 is a section, on line 6—6 of Fig. 3, showing an economizer associated with the secondary pressure reducer;

Fig. 7 is a top plan view of the economizer;

Fig. 8 is an enlarged view of the apparatus partly in section and including a commercial gasoline carburetor, a venturi and a starting valve operatively connected for selectively introducing either butane or gasoline to the intake manifold of an engine;

Fig. 9 is a view, partly in section, of a modified form of venturi and air intake arranged with a special form of choke device adapted for automatic operation for varying the volume of air admitted to the venturi;

Fig. 10 is a section of the same on line 10—10 of Fig. 9;

Fig. 11 shows a Venturi tube adapted for connection with a down draft carburetor and having an automatic choke device therein; and Fig. 12 is a section of the economizer taken on line 12—12 of Fig. 3.

Briefly described my improved apparatus comprises a primary reducing valve A connected by means of a pipe A' with a secondary pressure regulator B, a heat exchanger C adapted to receive the butane gas direct from a storage tank D, a starting valve E interposed between the secondary pressure regulator B and a venturi F, an economizer G preferably connected in the outlet line from regulator B and, when desirable, a carburetor H for gasoline, all as shown in Fig. 1.

A separate gasoline tank I is provided for connection with carburetor H by means of a tube 1 and as shown in Fig. 8, the carburetor H is connected with venturi F at 2 and gasoline is adapted to be fed through a passage 3 under control of an adjusting screw 4 and a shut off valve 5 to an annular passage 6 and thence through apertures 7, 7, etc. into the venturi 8. An air bleeder 9 is usually provided in communication with passage 3, the operation and use of which is well known.

A throttle valve 10 is provided as usual in the neck 11 leading from the venturi F for connection with a manifold 12 and is adapted to be manually operated by means of a lever 13 and a rod 14 connected therewith, as shown in Fig. 8. Air is admitted to the venturi through a chamber 15 which is equipped with an automatic choke valve 16 including a stationary member 17 with apertures 18 therein and a relatively movable and gravity or otherwise actuated member 19 of substantially conical form adapted to seat normally upon the member 17 and to form a closure for the apertures 18. Thus, as suction in the venturi F is increased during the operation of the engine to a sufficient extent the member 19 will gradually rise from its seat on member 17 and open the venturi to the passage of air in sufficient volume to operate the engine.

Butane gas from tank D is supplied through a tube 20 and an inlet 21 to one or more coils 22, 22, which are composed of a plurality of convolutions or sections housed within a chamber 23 of a case which also serves to enclose the secondary pressure regulator B, as shown in Figs. 3 and 4. Hot water is adapted to be circulated through chamber 23 by means of pipes 24 and 25 connected at different points with the water cooling system of an engine J, so as to complete or effect the thorough volatilization of the butane gas supplied from the tank D before the gas is introduced into the venturi F. Chamber 23 is accessible through a removable wall 26 which also serves to support the primary and secondary regulators and the heat exchanger as a unit on the instrument board 27 of a vehicle.

The heat exchanger and regulator unit shown in Fig. 3 is preferably formed of a base section 28 attachable to wall 26 by means of screws 29 and provided with a partition 30 forming a wall for chamber 23, an outer section 31 provided with a chamber 32 therein and having an outer wall 33 with a central boss 34, and a pair of mating smaller sections 35 and 36 held together by screws 37 and secured to section 31 by means of a screw 38 extending through the bottom of an extension 39 and into boss 34.

Section 36 forming a portion of the primary pressure reducer A has a chamber 40 with an inlet 41 which is connected by means of a tube 42 so that volatile gas from coils 22 of the heat exchanger may be conducted at prevailing pressures substantially above atmospheric pressure to the primary regulator A. A diaphragm 44 is held between sections 35 and 36 of the regulator body so as to span the chamber 40 and is tensioned by means of a compression spring 45 seated in a bore of extension 39 for the purpose of urging valve seat 46 associated therewith into open position relative to the inlet 41, as shown in Fig. 3. Said valve seat is carried on the outer end of a lever 47 which is pivotally held at 48 on a portion of the case member 36 and is pivotally connected at 49 with a post 50 extending outwardly from the diaphragm 44. An intermediate flat spring as at 51, however, attached to said diaphragm and having its free end engaging the lever 47 at a point below its fulcrum serves to urge the valve seat 46 into closing position and also prevents vibration and chattering of the valve parts during the operation of the regulator.

The tension of spring 45 serves to open valve seat 46 and as the pressure is built up in chamber 40 to a predetermined point the diaphragm 44 is urged inwardly to valve closing position until the pressure is relieved through the outlet 52 and pipe 1 as the gas is displaced into chamber 32 of the secondary regulator. The gas at a substantially reduced pressure (usually ten pounds or more) is admitted to chamber 32 of the secondary regulator through an inlet 53 which is controlled by a valve 54 comprising a lever 55 pivoted at 56 to the case section 31 and tensioned by means of a flat spring 57 extended from said lever to a position adjacent an adjusting screw 58 in the wall 33 of the case.

Intermediate case sections 28 and 31 a diaphragm 59 is tightly held within chamber 32 and is centrally connected at 60 with a link 61 which is pivoted at 62 adjacent ends of toggles 63 and 64, as shown in Fig. 3. Toggle 63 is pivotally held on the case at a fixed point 65 and toggle 64 is pivotally connected at 66 with the free end of lever 55 so as to open and close valve 54 as the diaphragm is extended and depressed, respectively, the movement of the toggles being limited inwardly by means of a pin 67. In addition to spring 57 the toggles 63 and 64 are tensioned by means of a tension spring 68 attached at points 69 and 70 to corresponding portions of said toggles, thereby tending to urge the toggles and valve 54 to inlet closing position. It is obvious that as suction is increased in the chamber 32 the diaphragm will be actuated so as to open valve 54 at a predetermined partial vacuum, any partial vacuum approximately one-eighth below atmospheric pressure serving to open the tensioned valve 54, while the expansion of the gas tends to counterbalance the partial vacuum and when the same is reduced to a predetermined point the tension of springs 57 and 68 are effective for closing the valve 54.

Chamber 32 has an outlet 71 to which I prefer to attach the economizer G as shown in Figs. 3, 6 and 7, for the purpose of regulating the outflow of gas from chamber 32 in regulated volume to meet different conditions of operation. The economizer includes a cylindrical body 72 with the inlet 71 thereon and adapted to be attached to the housing of chamber 32 and a right angularly extended outlet 73 adapted for connection with the inlet 75 of starting valve E by means of a pipe 74, a flange 76 and a rotatable valve 77 and other elements as hereinafter described. Member 72 has a bore 78 for rotatably holding an annular valve 77 within which a piston valve 79 is movable against the tension of a spring 80 carried on a stem 81. The annular valve 77 has an elongated peripheral aperture 82 which when the valve is rotatably adjusted in the barrel 72 varies the effective area of the passage to outlet 73, as shown in Fig. 6, while the piston 79 is automatically adjustable by suction within the valve 77 for varying the width of the aperture 82 and thereby varying the area of the outlet passage to correspond to the operating requirements of an engine.

A suction operated diaphragm 83 is clamped between a flange 84 on member 77 and a closure 85 adjacent a vacuum chamber 86 which has a connection 87 leading to the intake manifold so that suction from the engine will be applied to and serve to operate the diaphragm 83 and piston valve 79 for reducing the volume of fuel as the speed of the engine increases. It will be understood that the annular valve 77 while adjustable in the barrel 72 is adapted to be set at a fixed position for limiting the amount of gas through aperture 82 when the piston is at its lowest position as shown in Fig. 6, and the aperture is further limited in area automatically during the operation of the engine by the movement of the piston valve. Valve 77 is set by means of a bolt or pin 88 held in the flange of closure 85 and extended through an arcuate slot 89 in flange 76 of barrel 72, a nut 88′ being provided on said bolt for tightening the valve when the valve is suitably adjusted. Member 85 has an indicator 90 on its periphery adapted to register selectively with a scale 91 of numerals formed on a segmental extension 92 of flange 76, as shown in Fig. 7. Thus, the adjustment of valve 77 to a desired point on the scale 91 as indicated by the indicator 90 for a given kind of fuel or mixture of fuel and air and for given operating conditions may be readily effected. Piston stem 81 is attached to diaphragm 83 and is adapted to engage the inner end of a screw 93 for limiting the outward thrust of the piston in barrel 77. Screw 93 is not adjustable but the extent to which it projects into the diaphragm chamber is determined and regulated by the employment of one or more washers 94 held between the head of screw 93 and the end of closure 85, as shown in Fig. 6, so that said screw may not be displaced or its adjustment impaired by accident or otherwise.

I prefer to employ a starting valve E of the character shown in Fig. 8 between the economizer G and the venturi F so that gas delivered from the economizer through pipe 74 may be further regulated in volume to meet starting requirements of the engine. A suitable valve for such purpose includes a circular body 95 with a bore 96 therein adapted to rotatably support a valve 97 which serves to regulate the flow of gas from pipe 74 to the intake manifold. Valve body 95 has a port 98 diametrically opposite the inlet 75 which serves as both an inlet and an outlet and which is attachable to an inlet extension 99 on pipe 11 in which the venturi F is held and having a passage 100 therein for affording communication between outlet 99 and annular passage 6 of the venturi.

Valve 97 has a diametrical bore 101 which communicates at one end with a narrow inlet recess 102 on the periphery of the valve and at its opposite end with an outlet recess 103 also on the periphery of the valve. Recess 102 is variable in area by means of the adjustment of a screw 104 which is threaded into the annular wall of the body and projects into said recess to a desired extent, the width of the recess corresponding to the diameter of said screw. A by-pass outlet 105 is provided on the body 95 for connection with the intake manifold by means of a pipe 106 and the peripheral recess 103 is of such form that it may span the two outlets 98 and 105 under certain operating conditions, or said outlets may be selectively opened or closed at will.

The starting valve as shown in Fig. 8 is adjusted to starting position so that the gas will flow directly from the valve to the intake manifold through pipe 106 while air is drawn through the air inlet to the carburetor through holes 7 in the venturi, space 6 and pipes 100 and 98 to outlet 105 and thence direct to the intake manifold. When however, the engine has been started the valve 97 is adjusted by means of a lever 107 and rod 108 (see Fig. 1) so that the bore 101 of the valve will conduct the gas directly from inlet 75 to outlet 98 and close outlet 105, as shown in broken lines in Fig. 8. A suitable stop (not shown) may be used as in other carburetors for limiting the movement of the lever 107. A shut off valve 109 is provided in extension 99 for closing passage 100 when the carburetor H is in use and said valve is interposed between outlet 98 and the venturi F.

As shown in Fig. 9, air inlet pipe 110 is provided for connection with the lower end of the venturi F and said inlet may have an air cleaner 111 attached thereto. When such an air cleaner is used a modified form of choke valve may be employed in lieu of the form shown in Fig. 8 and partakes preferably of the form shown in Figs. 9 and 10. Said choke valve includes a pair of semi-circular flaps 112 and 113 with inner curled portions 115 and 116, respectively, through which pins 117 and 118 are axially extended and have their bearings at opposite ends in the wall of pipe 114. The outer peripheries of the flaps are concentric with and closely fit the inner periphery of pipe 114 though their inner curled portions are slightly spaced apart so as to provide a minimum area for the passage of air when the flaps are closed.

Each of the flaps 112 and 113 is doubly tensioned by means of a pair of springs 119 and 120 of different tension against opening and closing, respectively. The weaker springs 119 tension the flaps against opening inwardly by suction in pipe 114 while the stronger springs tension the flaps against opening outwardly as in the case of a backfire from the engine. Said springs are held on the pintles 117 and 118 and have opposite ends engaging the flaps and connected with the wall of pipe 114, as shown in Fig. 10. Thus the springs 119 will urge the flaps to closed position when the flaps are opened by suction from the engine and the springs 120 will urge the flaps to closed position following a backfire.

In the form of choke valve shown in Fig. 8 when the suction from the engine is great enough the cap 19 will be lifted from its seat on the member 17 and permit air to flow upwardly through the apertures 15 and the central aperture of the cap and when the suction has been decreased to a given extent the cap will fall by gravity to closing position over the apertures 15. In the event of a backfire the sudden and forcible expulsion of air and the products of combustion through the venturi and the outward expansion and deflection of the same beneath the cap 19 will serve to prevent the restoration of the cap to its closed position on member 17 until the pressure is sufficiently relieved below the cap.

As shown in Fig. 11, when a downdraft carburetor is used on an engine a choke valve of the character shown in Fig. 10 is preferable for use and the same is positioned above the venturi, the operation being the same as hereinabove described.

Reference is had to Figs. 4 and 5 in which certain structural details of an improved heat exchanger are shown for effectively heating and vaporizing the liquid fuel prior to its introduction into the intake manifold of an engine. I prefer to incorporate in said heat exchanger a pair of small copper tubes in lieu of a single larger tube so as to more quickly heat and volatilize the butane, and to this end provide, as shown in Fig. 5, an inlet and outlet fitting as at 22' adapted to be screwed into a wall of the body and to commonly receive adjacent ends of the two coils 22, thereby necessitating but one pipe leading to and one pipe leading from the heat exchanger.

The operation of the apparatus is as follows:

When the several elements of the apparatus are connected as shown in Figs. 1 and 8 valve 109 may be closed and valve 5 opened if ordinary gasoline is to be used as a fuel and starting valve E may be operated to prevent flow of butane gas to the intake manifold. In such event gasoline is supplied through passage 3 from carburetor H to chamber 8 of venturi F and thence to the engine, the choke valve 19 or the pair of choke valves 112 and 113 as the case may be remaining closed until the suction in the venturi is built up to a point sufficient to lift the valve 19 from its seat or open the flaps 112 and 113 against the tension of their springs 119, 120, thereby admitting air for mixture with the fuel in proper volume to meet operating requirements.

When the butane carburetor is to be used valve 109 is opened and valve 5 closed and starting valve E is adjusted to the position shown in Fig. 8 for starting the engine so that butane may flow through by-pass 106 directly to the intake manifold 12 from pipe 74 which connects the starting valve with the pressure regulator B. If desirable gasoline may be used for starting the engine by opening valve 5. In any event when the engine becomes sufficiently heated the starting valve E is further adjusted to complete open position so that that the bore 101 therein will conduct the butane gas directly through said valve from pipe 74 to passage 100 from which passage it is fed to the venturi F in necessary volume depending upon the engine requirements.

It will be understood that the butane is constantly at atmospheric pressure until it leaves the chamber 32 of the secondary regulator B and the metering thereof is effected in the economizer G by means of the dual valves 77 and 79, valve 77 being fixed in its adjustment to approximately meet the conditions of operation while valve 79 is automatically operable by suction from the engine for varying the volume of fuel delivered to the engine so that a rich mixture is provided for full throttle conditions and a leaner mixture when less power is needed.

It will be seen that with the addition of the means described, the venturi of any gasoline carburetor may be used for the carburetion of a gaseous fuel, at the same time retaining the original value as a carburetor of gasoline if such fuel is desired.

It should be noted that the purpose of the choke, see Fig. 10, is not only to vary the mixture for starting and idling, but according to the characteristics of springs 119, to vary the air-to-fuel ratio over the entire running range of the engine.

What I claim as new and desire to secure by Letters Patent, is:

1. A fuel supply apparatus for internal combustion engines comprising: a carburetor provided with an air inlet and a fuel inlet adapted for connection with the intake manifold of an engine, a tank for holding fuel under pressure, pressure regulating means connected with and interposed between said fuel tank and the fuel inlet and including a plurality of interconnected pressure regulating units for reducing the pressure of said fuel in successive stages to approximately atmospheric pressure for introduction into said engine for combustion, and automatic fuel control means associated with said final regulating unit for varying the air-to-fuel ratio delivered to said engine.

2. A fuel supply apparatus for internal combustion engines comprising: an air and gaseous fuel inlet means adapted for connection with the intake manifold of an engine, a tank for holding gaseous fuel, pressure regulating means connected with and interposed between said tank and the said inlet means and including pressure regulating means for reducing the pressure of said gaseous fuel to approximately atmospheric pressure for introduction into said engine for combustion, and fuel control means associated with said pressure regulating means for regulating the volume of fuel delivered to said engine, said fuel control means including separate valves relatively operable and coacting for varying the fuel supply to meet requirements of combustion.

3. A fuel supply apparatus for internal combustion engines comprising: inlet means having a venturi provided with an air inlet and a fuel inlet for gaseous fuel adapted for connection with the intake manifold of an engine, a tank for holding gaseous fuel, pressure regulating means connected with and interposed between said fuel tank and said fuel inlet of said venturi and including a plurality of interconnected pressure regulating units for reducing the pressure of said gaseous fuel in successive stages to approximately atmospheric pressure for introduction into said engine for combustion, fuel control means carried by said final regulating unit for regulating the volume of fuel delivered to said engine, said fuel control means including a valve adapted to be fixed in its adjustment relative to an outlet for the fuel, and an automatically operable valve operable by suction from the engine so as to vary the volume of fuel to correspond to requirements of economical fuel consumption.

4. A fuel supply apparatus for internal combustion engines comprising: inlet means having a venturi provided with an air inlet and a fuel inlet for gaseous fuel adapted for connection with the intake manifold of an engine, a tank for holding gaseous fuel, pressure regulating means connected with and interposed between said fuel tank and said fuel inlet of said venturi for reducing the pressure of said gaseous fuel to atmospheric pressure for introduction into said engine for combustion, and a manually operable valve adjacent said fuel inlet and including a casing having a fuel inlet and a pair of fuel outlets and a valve movable relative to and for selectively connecting said last mentioned inlet with said outlets, one of said outlets being connected with said first mentioned inlet and the other outlet being connected directly with the intake of said engine.

5. A fuel supply apparatus for internal combustion engines comprising: inlet means having an air inlet and a fuel inlet, a self contained unit including: a primary pressure regulator adapted for connection with a source of gaseous fuel under pressure, a secondary pressure regulator connected with said primary regulator and with said inlet means and operable for delivering fuel to said inlet means at atmospheric pressure, a heating device for volatilizing said fuel prior to its introduction to said primary regulator, and fuel control means connected with and for varying the volume of fuel at approximately atmospheric pressure delivered from said secondary regulator.

6. A fuel supply apparatus for internal combustion engines comprising: a manifold having air and fuel inlet means, a self contained unit including: a pressure regulating means for delivering fuel to said valve means, said valve means being of substantially smaller capacity at approximately atmospheric pressure, a heating device connected with the fuel line in advance of and for volatilizing said fuel prior to its introduction to said regulator, and fuel control means for varying the volume of fuel at approximately atmospheric pressure delivered from said regulator, said fuel control means including a pair of relatively operable valves at least one of which is automatically operable so as to vary the air-to-fuel ratio delivered to the engine.

7. A fuel supply apparatus for internal combustion engines comprising: a carburetor having air and fuel inlet means, a self contained unit including: a primary pressure regulator adapted for connection with a source of gaseous fuel under pressure, a secondary pressure regulator connected with said primary regulator and with said inlet means and operable for delivering fuel to said inlet means at atmospheric pressure, a heating device connected with and for volatilizing said fuel prior to its introduction to said primary regulator, fuel control means between said secondary regulator and said carburetor for varying the volume of fuel at approximately atmospheric pressure delivered from said secondary regulator, said fuel control means including a valve adapted to be adjusted to and set at a fixed position for approximating operating requirements, and a relatively adjustable and automatically operable valve cooperatively engaging the first named valve and connected with and adapted for operation by suction from the intake manifold of the engine.

8. A fuel supply apparatus for internal combustion engines comprising: a carburetor having air and fuel inlet means, a self contained unit including a primary pressure regulator adapted for connection with a source of gaseous fuel under pressure, a secondary pressure regulator connected with said primary regulator and with said inlet means and operable for delivering fuel to said inlet means at approximately atmospheric pressure, a heating element associated with the fuel supply means for volatilizing said fuel prior to its introduction to said primary regulator, said primary and secondary regulators each having an expansion chamber, the chamber of said primary regulator being of substantially less capacity than the chamber of said secondary regulator, a pressure operated diaphragm in each of said regulator chambers, and means connected with said diaphragms for regulating the supply of fuel to said chambers, respectively.

9. A fuel supply apparatus for internal combustion engines comprising: a carburetor having air and fuel inlet means, a self contained unit including: a primary pressure regulator adapted for connection with a source of gaseous fuel under pressure, a secondary pressure regulator connected with said primary regulator and with said inlet means and operable for delivering fuel to said inlet means at approximately atmospheric pressure, a heating element associated with the fuel supply means for volatilizing said fuel prior to its introduction to said primary regulator, said primary regulator having an expansion chamber therein and a pressure operated diaphragm forming a side thereof, a valve controlled inlet to said chamber, and means connecting the valve of said inlet with said diaphragm for closing the inlet valve when a predetermined pressure is built up in said chamber.

10. A fuel supply apparatus for internal combustion engines comprising: a carburetor having air and fuel inlet means, a self contained unit including: a primary pressure regulator adapted for connection with a source of gaseous fuel under pressure, a secondary pressure regulator connected with said primary regulator and with said inlet means and operable for delivering fuel to said inlet means at approximately atmospheric pressure, a heating element associated with the fuel supply means for volatilizing said fuel prior to its introduction to said primary regulator, said secondary regulator having an expansion chamber therein and a diaphragm forming a side thereof, an inlet from said primary regulator for admitting a fuel to said chamber, a valve adjacent and for closing said inlet, and a toggle device in said chamber operatively connecting said valve and said diaphragm for closing said valve when a predetermined pressure is built up in said chamber.

GEORGE L. HOLZAPFEL.